United States Patent [19]

Meek et al.

[11] Patent Number: 5,573,070
[45] Date of Patent: Nov. 12, 1996

[54] LOW-PROFILE FOLDING MARKER FOR SEED PLANTERS AND THE LIKE

[75] Inventors: Roger L. Meek; J. Michael McClure, both of Salina, Kans.

[73] Assignee: Great Plains Manufacturing Incorporated, Assaria, Kans.

[21] Appl. No.: 609,891

[22] Filed: Mar. 1, 1996

Related U.S. Application Data

[63] Continuation of Ser. No. 274,986, Jul. 13, 1994, abandoned.

[51] Int. Cl.⁶ ..................................... A01B 35/32
[52] U.S. Cl. .............. 172/131; 172/456; 111/33
[58] Field of Search ................................ 172/126, 127, 172/128, 129, 130, 131, 132, 224, 225, 230, 233, 234, 776, 456; 104/244.1; 111/25, 33; 171/6

[56] References Cited

U.S. PATENT DOCUMENTS

| | | | |
|---|---|---|---|
| 3,158,204 | 11/1964 | Martin | 11/33 |
| 3,196,955 | 7/1965 | Ogle, Jr. | 172/225 |
| 3,666,019 | 5/1972 | Yeske | 172/130 |
| 3,799,272 | 3/1974 | Watson | 172/126 |
| 4,151,886 | 5/1979 | Boetto et al. | 172/456 X |
| 4,171,726 | 10/1979 | Ward | 172/456 |
| 4,207,950 | 6/1980 | Kinzenbaw . | |
| 4,281,720 | 8/1981 | Tusing | 172/126 X |
| 4,320,805 | 3/1982 | Winter | 172/776 |
| 4,365,672 | 12/1982 | Robinson, Jr. et al. | 172/130 X |
| 4,415,043 | 11/1983 | Hadler et al. | 172/776 |
| 4,418,763 | 12/1983 | Boetto | 172/456 X |
| 4,449,590 | 5/1984 | Williamson . | |
| 4,512,416 | 4/1985 | Smith | 172/776 |
| 4,526,235 | 7/1985 | Kinzenbaw | 172/126 |
| 4,529,043 | 7/1985 | Jensen et al. | 172/776 |
| 4,583,598 | 4/1986 | Knels | 172/126 |
| 4,615,397 | 10/1986 | Hastings | 172/776 |
| 4,674,578 | 6/1987 | Bexten et al. | 172/126 |
| 4,825,957 | 5/1989 | White et al. | 172/126 |
| 4,878,545 | 11/1989 | Dyken | 172/776 |
| 4,923,017 | 5/1990 | Meek et al. | 172/776 |
| 4,986,367 | 1/1991 | Kinzenbaw | 172/126 |
| 5,379,847 | 1/1995 | Snyder | 172/126 X |

*Primary Examiner*—Terry Lee Melius
*Assistant Examiner*—Victor Batson
*Attorney, Agent, or Firm*—Hovey, Williams, Timmons & Collins

[57] ABSTRACT

A low profile folding row marker apparatus is provided for use with an agricultural implement, such as a seed planter or the like. The apparatus includes inboard and outboard arm assemblies that are supported on the implement by a marker mount. The inboard and outboard arm assemblies are connected to the marker mount and to each other for relative pivotal movement about horizontal axes between a generally vertical storage position and a generally horizontal use position. A linkage assembly is connected between the inboard and outboard arm assemblies for controlling relative movement of the outboard arm assembly, and an actuating means is provided between the marker mount and the linkage assembly for moving the inboard and outboard arm assemblies sequentially between the storage and use positions.

9 Claims, 4 Drawing Sheets

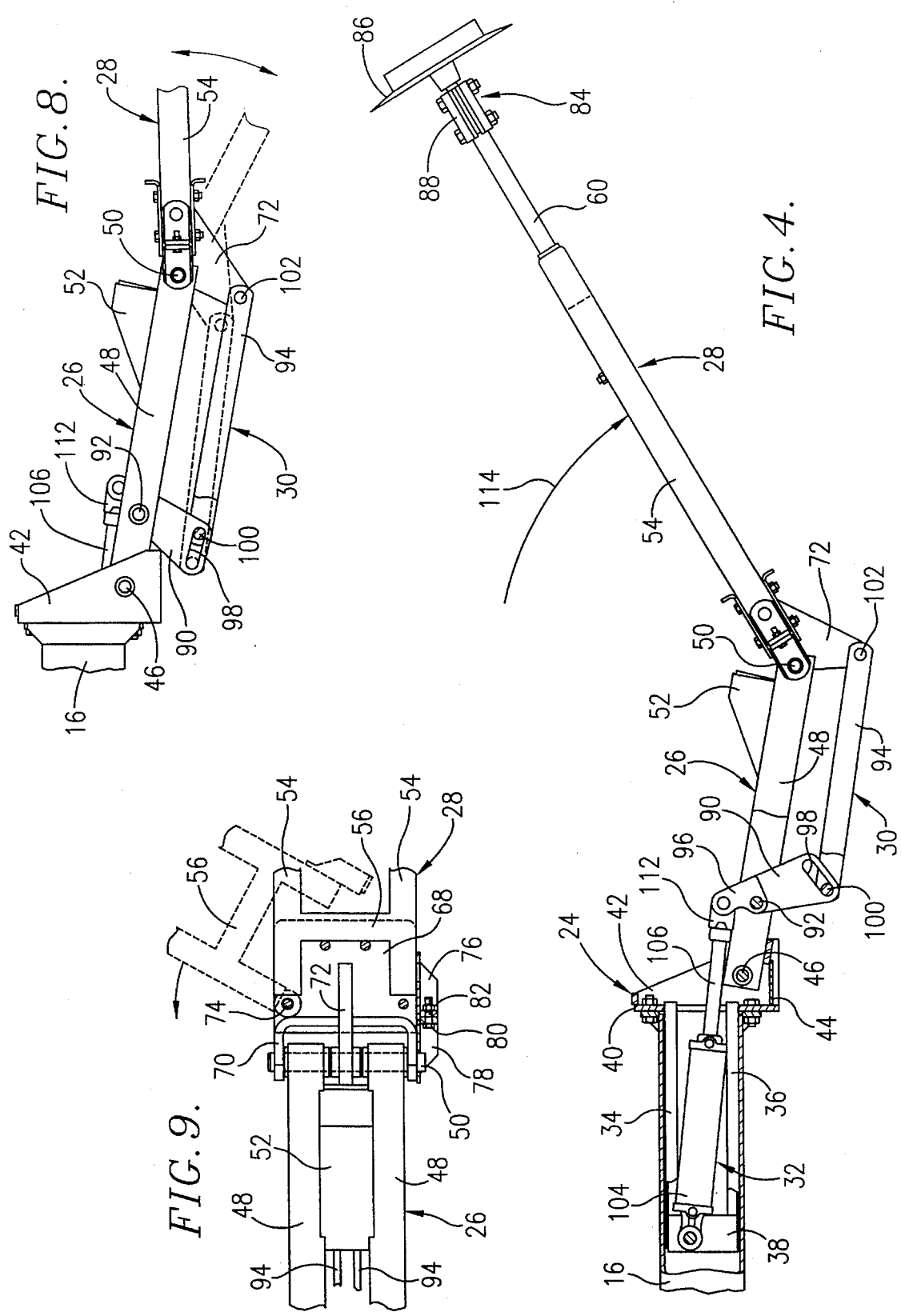

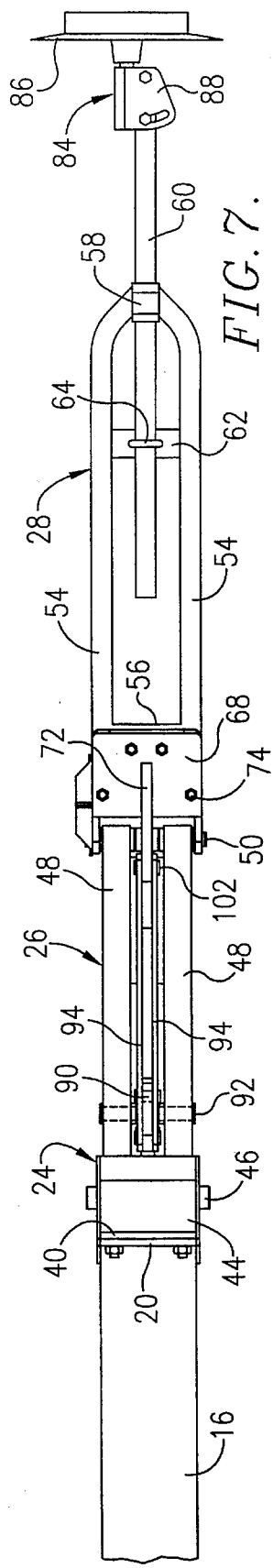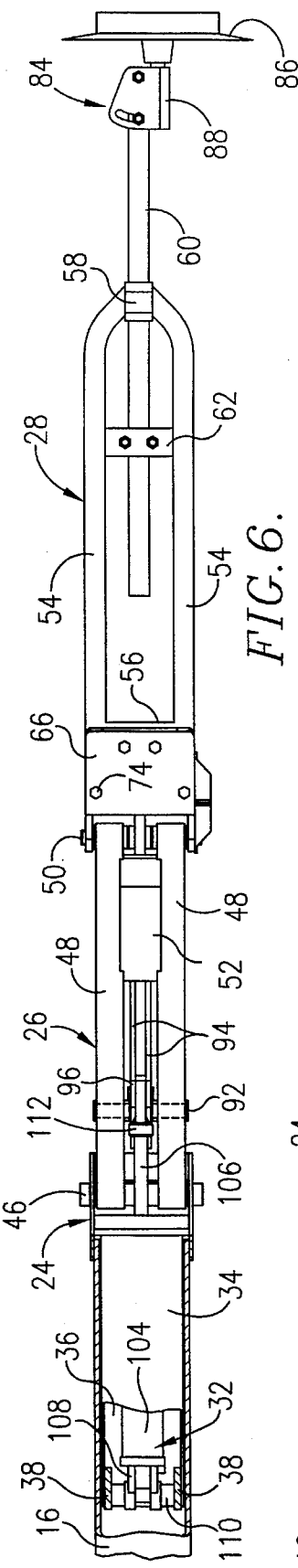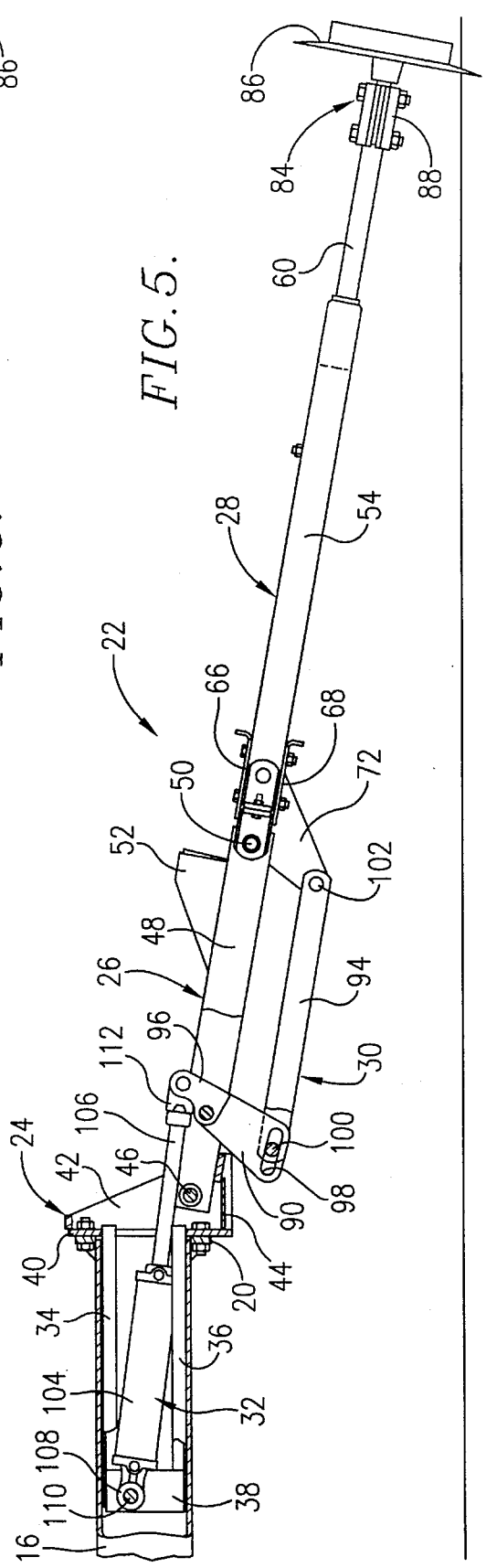

LOW-PROFILE FOLDING MARKER FOR SEED PLANTERS AND THE LIKE

This is a continuation of application Ser. No. 08/274,986, filed Jul. 13, 1994, now abandoned.

BACKGROUND OF THE INVENTION

1. Field of the Invention

The present invention relates generally to agricultural implements, and more particularly to a low profile folding row marker for use on seed planters and the like.

2. Discussion of the Prior Art

It is conventional to provide an agricultural implement, such as a seed planter, grain drill or the like, on which a pair of row markers are provided. Typically, such markers are used for forming a line in the soil during each pass of the implement through a field so that the farmer can line up with the mark during a subsequent pass, thus permitting uniform coverage by the implement.

A known seed planter includes a frame, a pair of ground-engaging wheels for supporting the frame in use, several planter units arranged side-by-side along the frame, and a pair of row markers. The frame typically includes a hollow, tubular frame element or tool bar, which extends in a direction transverse to the direction in which the implement travels during use.

One known type of row marker employed with conventional implements includes a mount adapted to connect to and extend forward of the tool bar of the implement, and two or three separate arm assemblies connected to each other and to the mount for articulated pivotal movement between storage and use positions. In the storage position, the inboard arm assembly is oriented perpendicular to the ground and the outboard assembly extends in a direction parallel to the ground and overlies the tool bar. In the use position, both assemblies extend laterally from the frame in the same direction, and position a marker disk against the ground so that the disk cuts into the ground during travel of the implement.

This conventional type of marker apparatus is hydraulically actuated, and includes a cylinder assembly connected between the mount and the outboard arm assembly. When the device is moved to the storage position, the cylinder assembly first pivots the outboard assembly relative to the inboard assembly to a position perpendicular to the ground. Thereafter, further actuation of the cylinder assembly pulls the arm assemblies upward together to the storage position.

Numerous problems have been identified in connection with conventional marker devices. For example, because the cylinder assembly extends along the length of the inboard arm assembly, it is always exposed to the elements, and may easily be damaged during use by debris thrown up from the ground by the implement or tractor. In addition, conventional devices are typically designed for use on a particular implement, and are not easily installed on different types of implements.

Another type of conventional row marker includes a cylinder assembly that is mounted within the frame of a planter, and a linkage connected between the cylinder assembly, the mount, and the outboard arm assembly. The cylinder assembly of this known type of marker is protected from the elements during storage of the arm assemblies. However, because the linkage is connected to the mount of the device, it causes the outboard arm assembly to unfold relative to the inboard assembly at the same time that the inboard assembly is being deployed. This movement is jerky, rendering the unfolding operation more difficult to control than with a device employing sequential movement of the arm assemblies.

OBJECTS AND SUMMARY OF THE INVENTION

It is an object of the present invention to provide a low profile row marker apparatus that employs a single actuating cylinder assembly that is protected by the frame of the implement at all times so that damage to the cylinder assembly is inhibited, while at the same time providing sequential unfolding of a pair of arm assemblies from a storage position.

It is another object of the present invention to provide a row marker apparatus in which the cylinder assembly includes a rod that is retracted when the apparatus is in a storage position. Thus, exposure of the rod to the elements is also minimized.

In accordance with these and other objects evident from the following description of a preferred embodiment of the invention, a low profile folding row marker apparatus is provided for use with an agricultural implement, such as a seed planter, grain drill or the like. The apparatus includes a marker mount adapted to be supported on the implement, an inboard arm assembly connected to the marker mount for relative pivotal movement about a first horizontal axis between a generally vertical storage position and a generally horizontal use position, and an outboard arm assembly connected to the inboard arm assembly for relative pivotal movement about a second horizontal axis parallel to the first axis.

A marker is carried on a free end of the outer arm assembly of the apparatus and is adapted to engage the ground when the inboard and outboard arm assemblies are in the use position. A linkage assembly is connected between the inboard and outboard arm assemblies for controlling relative movement of the outboard arm assembly, and a hydraulic cylinder is connected between the marker mount and the linkage assembly for moving the inboard and outboard arm assemblies between the storage and use positions. Thus, the hydraulic cylinder and linkage assembly provide an actuating mechanism for moving the inboard and outboard arm assemblies.

By providing a row marker apparatus in accordance with the present invention, numerous advantages are realized. For example, by employing a linkage assembly between the inboard and outboard arm assemblies, and an a hydraulic cylinder connected between the marker mount and the linkage assembly, it is possible to operate the two-piece marker apparatus using a single actuator. Further, use of a linkage assembly between the arm assemblies allows for the hydraulic cylinder to be protected within the tool bar of a seed planter or the like so that it is not easily damaged during use.

Preferably, the linkage assembly also includes a float means for permitting a limited range of free, relative pivotal movement of the outboard arm assembly so that it can float relative to the inboard assembly during use and maintain contact between the marker and the ground. This float means also permits some free movement of the outboard arm assembly when the apparatus is moved between the storage and use positions such that gravity supplements the actuating means.

BRIEF DESCRIPTION OF THE DRAWING FIGURES

The preferred embodiment of the present invention is described in detail below with reference to the attached drawing figures, wherein:

FIG. 4 is a front elevational view, partially in section, of the row marker apparatus, illustrating the apparatus during movement away from the storage position;

FIG. 5 is a front elevational view, partially in section, of the row marker apparatus, illustrating the apparatus in the use position;

FIG. 6 is a top plan view of the apparatus, partially in section;

FIG. 7 is a bottom plan view of the apparatus;

FIG. 8 is a fragmentary front elevational view of the apparatus, illustrating the range of float of the outboard arm assembly during use; and FIG. 9 is a fragmentary top plan view of the apparatus, illustrating a breakaway feature of the invention.

DETAILED DESCRIPTION OF THE PREFERRED EMBODIMENT

Figure 1:
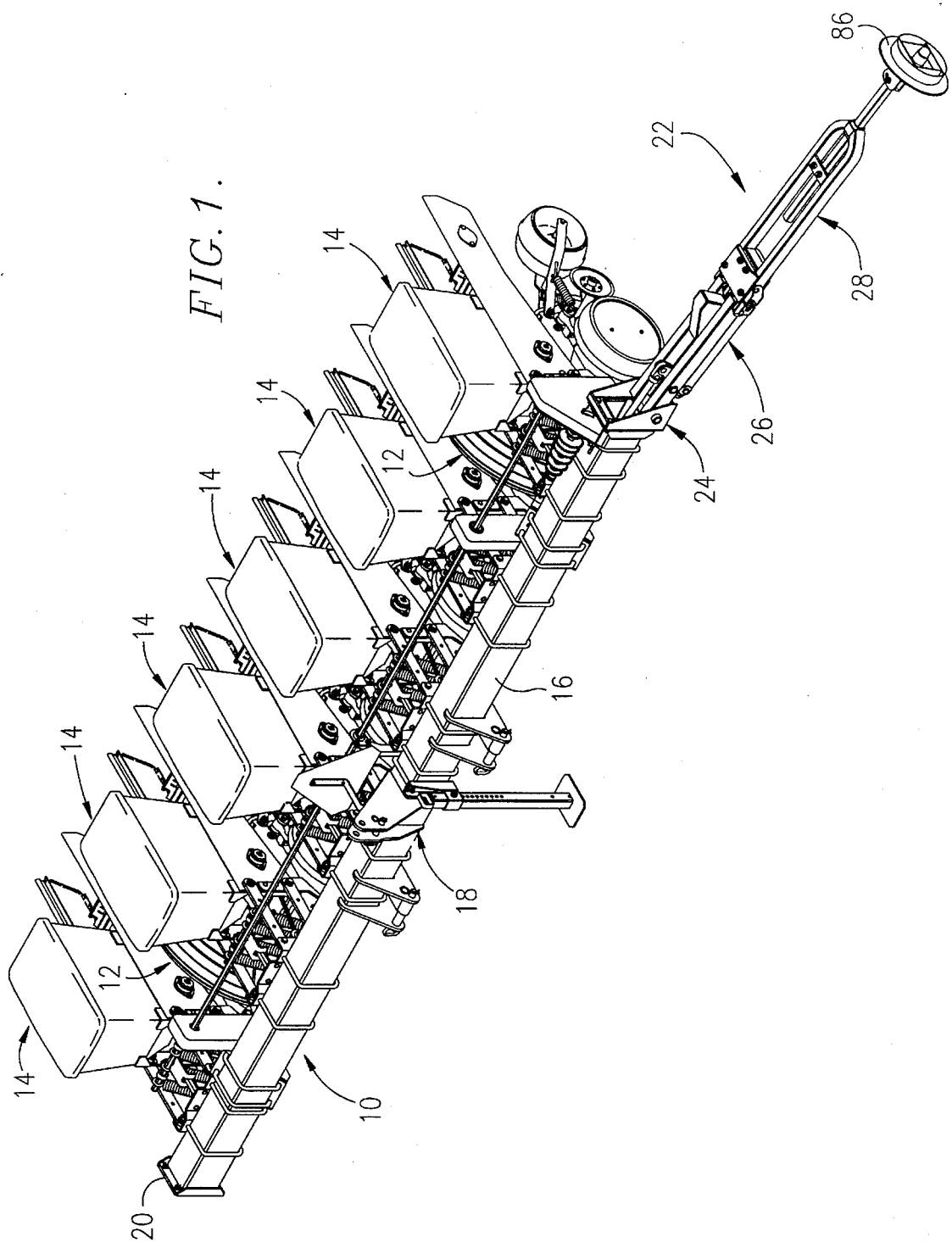
FIG. 1 is a perspective view of a seed planter including a row marker constructed in accordance with the preferred embodiment.

A seed planter is shown in FIG. 1, and generally includes a frame 10, a pair of ground-engaging wheels 12 for supporting the frame in use, and several planter units 14 arranged side-by-side along the frame. The frame 10 includes a hollow, tubular tool bar 16, which extends in a direction transverse to the direction in which the implement travels during use. A hitch 18 is provided on the tool bar for permitting attachment of the planter to a tractor, and the planter units extend to the rear of the tool bar opposite the hitch.

The tool bar 16 presents a rectangular cross-sectional shape, and is open at each end for receipt of a row marker apparatus. As shown on the left-hand end of the tool bar, as illustrated in FIG. 1, a flange 20 is provided at each end of the tool bar for permitting attachment of a row marker apparatus.

The row marker apparatus 22 generally includes a mount assembly 24, an inboard arm assembly 26 connected to the mount for relative pivotal movement about a horizontal axis, and an outboard arm assembly 28 connected to the inboard assembly for relative pivotal movement about a second axis parallel to the first.

Turning to FIG. 5, the marker apparatus is illustrated as also including a linkage assembly 30 connected between the inboard and outboard arm assemblies for controlling relative movement of the outboard arm assembly, and a hydraulic actuating cylinder assembly 32 connected between the marker mount and the linkage assembly. The actuating cylinder assembly defines an actuating means for moving the arm assemblies between storage and use positions.

The marker mount assembly 24 includes an elongated carriage sized for receipt within the open end of the tool bar. The carriage is formed of opposed upper and lower channel-shaped plates 34, 36 which are connected together at one end by a pair of vertical plates 38 that are spaced from one another, as shown in FIG. 6. Returning to FIG. 5, the opposite ends of the channel-shaped plates 34, 36 are connected together by a rectangular face plate 40 that includes an open central area and is adapted to engage the flange 20 of the tool bar 16 when the carriage is received within the tool bar. Threaded fasteners such as bolt and nut combinations are used to secure the face plate and flange together to retain the apparatus on the implement.

A pair of spaced gussets 42 protrude from the sides of the face plate, and are connected together by a base plate 44 which adds rigidity to the mount assembly. A pin 46 is supported by the gussets 42, and defines a first horizontal pivot axis about which the inboard arm assembly 26 may be moved. The pin extends in a direction parallel to the direction of travel of the implement.

The inboard arm assembly 26 is illustrated in FIG. 6, and includes a pair of parallel arm sections 48, each supported for pivotal movement on the pin 46. The arm sections are spaced from and parallel to one another, and a pin 50 extends between the arms at a position remote from the pin 46, and supports the outboard arm assembly 28 for pivotal movement relative to the inboard assembly.

Figures 2, 3:
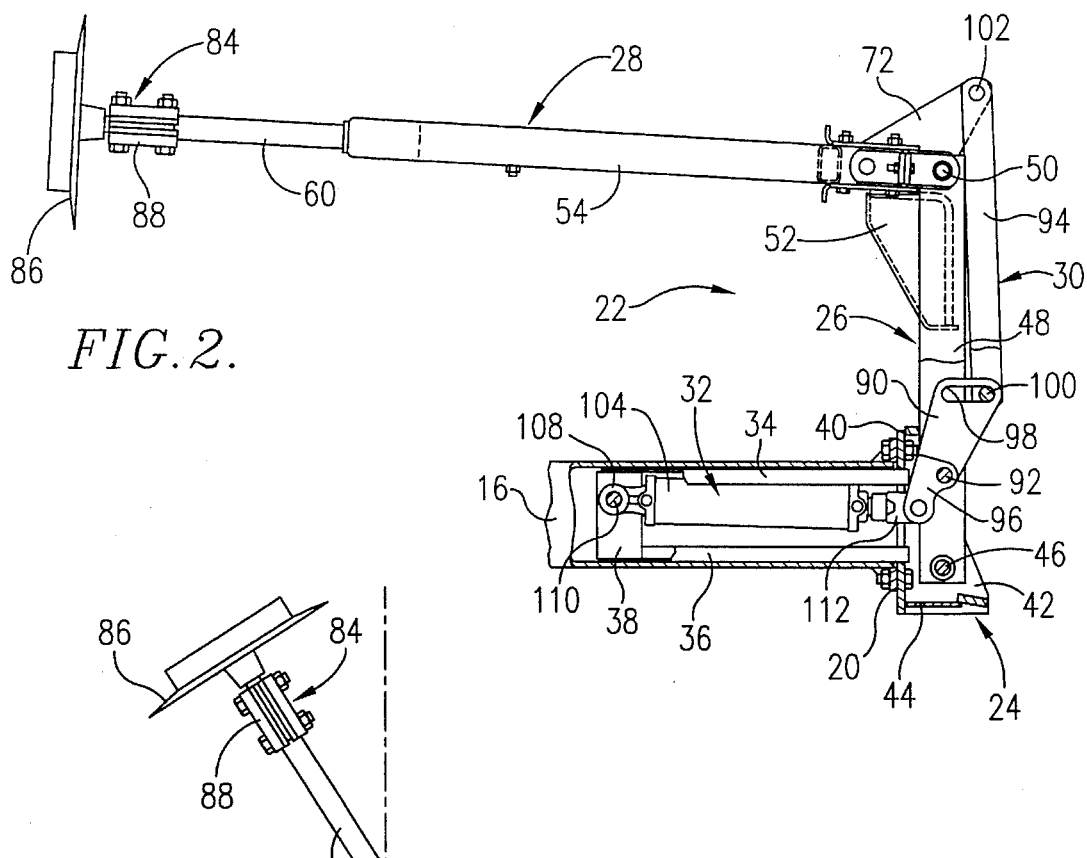
FIG. 2 is a front elevational view, partially in section, of the row marker apparatus, illustrating the apparatus in a storage position.
FIG. 3 is a front elevational view, partially in section, of the row marker apparatus, illustrating the apparatus during movement away from the storage position.

As shown in FIG. 5, a stop 52 is welded between the arm sections 48 and protrudes upward to define a stop surface against which the outboard arm assembly 28 abuts when the outboard arm assembly is pivoted to a position generally perpendicular to the inboard assembly. As shown in FIG. 2, the stop 52 also extends almost completely through the space defined between the arm sections 48, and prevents elements of the linkage assembly from moving into the space between the arm sections. Thus, the stop 52 serves the dual function of limiting movement of both the outboard arm assembly and the linkage assembly.

The outboard arm assembly 28 is illustrated in FIG. 6, and includes a pair of spaced arm sections 54 that are connected together at each end. The inboard ends of the sections 54 are connected together by a cross bar 56, as shown in FIG. 9, and the outboard ends of the sections taper toward one another and are joined at a collar 58 through which an outer extension 60 is received. A cross plate 62 extends between the arm sections 54 at a position intermediate the ends, and receives a U-shaped bolt 64 that serves the function of retaining the outer extension on the assembly, as shown in FIG. 7. As shown in FIG. 5, the outboard arm assembly includes a pair of spaced upper and lower mounting plates 66, 68 that are supported on the pin 50 for pivotal movement relative to the inboard assembly. Preferably, as shown in FIG. 9, a clevis 70 is secured between the plates and defines a pair of ears that protrude from between the plates to engage the pin 50. Thus, the mounting plates are only able to pivot about the pin and guide the outboard assembly during such movement. As shown in FIG. 5, a lug 72 is connected to and depends from the lower mounting plate 68. The lug is secured to the clevis 70, and includes a bushing through which the pin 50 extends. The lug includes an additional bushing at the free end thereof, to which the linkage assembly is connected.

The arm sections 54 are supported between the mounting plates for movement therewith, but include a breakaway means for permitting the arm sections and outer extension to break away from the inboard arm assembly and pivot about an axis extending in a direction perpendicular to the pin. Preferably, this means includes a pin 74 extending between the mounting plates and on which one of the arm sections is secured for pivotal movement. Additional fasteners extend between the mounting plates and sandwich the arm sections 54 between the plates while allowing relative movement of the sections.

An ear 76 protrudes inboard of the arm section opposite the pin 50, and another ear 78 protrudes outboard from an end of the clevis 70. These ears are provided with lateral flanges that normally abut one another. A threaded fastener such as a bolt and nut combination 80, 82 connect the flanges together and normally prevent the arm sections 54 from pivoting about the pin 74 during normal use of the apparatus.

When an obstruction is engaged by the marker apparatus, a moment is exerted on the outboard arm assembly, and the magnitude of this moment may be large enough to strip the nut 82 from the bolt 80 and allow pivoting movement of the arm sections 54 about the pin 74. In this manner, the outboard arm assembly is able to break away from the inboard assembly, if necessary, to protect the inboard assembly 26, linkage assembly 30, and actuating cylinder assembly 32 from damage.

The outer extension 60 is illustrated in FIG. 7, and includes an elongated tube that is received through the collar 58 and retained by the U-bolt 64. A marker disk assembly 84 is retained on the free end of the tube remote from the arm sections 54, and includes a disk 86 supported for rotation on an axle protruding from a hub 88. The hub is secured to the outer extension 60 by a pair of fasteners, and preferably includes a slot through which one of the fasteners extends. When the orientation of the hub is adjusted relative to the extension, the position of the fastener within the slot changes, and the orientation of the disk 86 is varied. Thus, it is possible to change the aggressiveness of the mark produced by the disk as the disk engages the ground during use.

The linkage assembly 30 is illustrated in FIG. 5, and includes a pivot link 90 supported for pivotal movement on the inboard arm assembly about a pin 92 positioned intermediate the pins 46, 50, and a transfer link 94 supported for pivotal movement on the outboard arm assembly. The pivot link is elongated, and receives the pin 92 intermediate the ends thereof. A clevis 96 is provided at one end of the pivot link for connection with the cylinder assembly 32, and a slot 98 is provided at the opposite end of the pivot link for connection with the transfer link.

The transfer link 94 is defined by a pair of parallel, elongated link elements, as shown in FIG. 7. A pin 100 extends between the elements 94 at one end and is adapted for receipt within the slot 98 of the pivot link, as shown in FIG. 5. Another pin 102 extends between the elements 94 at the opposite end thereof, and is received within the bushing of the depending lug 72 of the outboard arm assembly 28. As shown in FIG. 2, pivotal movement of the transfer link 94 is restricted by the stop 52 of the inboard arm assembly such that the transfer link is unable to pivot in the clockwise direction a significant distance beyond the position shown.

The cylinder assembly 32 is illustrated in FIG. 5, and includes a cylinder 104 and a piston rod 106. The cylinder 104 includes a clevis 108 at one end through which a pin 110 extends. The pin 110 connects the cylinder to the plates 38 and retains the cylinder on the carriage while permitting the cylinder to pivot within a limited range of movement between the channel-shaped plates 34, 36. The piston rod extends from the opposite end of the cylinder, and presents a free end on which a tang 112 is provided. The tang is received within the clevis 96 of the pivot link 90 such that operation of the cylinder assembly exerts a force directly on the pivot link. It will be appreciated that extension and retraction of the piston rod 106 relative to the cylinder 104 defines a line of action of the cylinder assembly 32 that is aligned with the axis of the rod.

Movement of the marker apparatus from the storage position to the use position is illustrated sequentially in FIGS. 2–5. Turning first to FIG. 2, the apparatus is illustrated in the storage position, with the inboard arm assembly 26 oriented perpendicular to the ground, and with the outboard arm assembly 28 oriented generally parallel to the ground and overlying the tool bar 16. This position of the apparatus presents a relatively low profile in which the marker apparatus does not extend laterally or protrude vertically beyond the planter by a distance which would impede travel of the planter to and from the field.

When the apparatus is in the storage position, the linkage assembly 30 and cylinder assembly 32 prevent the arm assemblies 26, 28 from moving from the position shown in FIG. 2. The piston rod 106 is retracted to protect the rod from contact with debris thrown up by the implement or tractor during travel. The rod locks the pivot link 90 in the position shown, and the transfer link 94 is blocked by the stop 52 from pivoting on the lug 72 in the clockwise direction. Thus, the outboard arm assembly is forced against the stop 52 by the link assembly, and is prevented from pivoting upward from a storage position. At the same time, the inboard arm assembly 26 is held in place by the cylinder assembly.

As the rod 106 is extended, it exerts a force on the pivot link 90 which tends to pivot the link in a counter-clockwise direction. However, because the transfer link 94 is restricted from pivoting beyond its FIG. 2 position since the outboard arm assembly 28 is against the stop 52, the pin 100 engages an end of the slot 98 and prevents the link 90 from pivoting about the pin 92. Thus, extension of the rod causes the inboard arm assembly to pivot about the pin 46, as shown in FIG. 3. During this movement, the outboard arm assembly continues to rest against the stop.

As the rod 106 continues to extend, the inboard arm assembly 26 pivots about the pin 46, and consequently, the pivotal connection (i.e., pin 92) of the pivot link 90 with the inboard arm assembly 26 lowers relative to the cylinder assembly 32. Eventually, the extending rod 106 has lowered the inboard arm assembly 26 and pin 92 to the position illustrated in FIG. 3. It is at this predetermined point along the path of travel of the inboard arm assembly that the line of action of the cylinder assembly 32 becomes disposed above the pin 92. In other words, the line of action of the cylinder assembly is below the pivotal connection 92 when the inboard arm assembly 26 is above the FIG. 3 position and eventually switches to the opposite side of the pivotal connection 92 when the inboard arm assembly 26 is below the FIG. 3 position. Thus, further extension of the rod 106 beyond the FIG. 3 position causes the pivot link 90 to pivot in an opposite, clockwise direction viewing FIG. 3. In this respect, as the rod 106 pivots the pivot link 90 about the pin 92, the transfer link 94 is pulled generally downwardly and leftwardly viewing FIG. 3, thereby unfolding the outboard arm assembly 28 relative to the inboard arm assembly 26. It will be appreciated that at some point along the respective paths of travel of the arm assemblies, gravity assists in lowering the inboard arm assembly 26 and unfolding the outboard arm assembly 28. In fact, it may be said that the cylinder assembly pushes the arm assemblies outward during the first half of the unfolding operation, and restrains the arm assemblies from dropping to the ground during the second half of the operation.

Once the inboard arm assembly is moved against the stop defined by the base plate 44, the inboard and outboard assemblies no longer move together toward the unfolded position. Rather, continued actuation of the cylinder assembly 32 lowers the outboard arm assembly toward the ground in the direction of the arrow 114. Thus, movement of the assemblies 26, 28 is carried out sequentially under the control of the cylinder assembly, with the inboard assembly moved first and the outboard assembly moved second. In this manner, the marker is unfolded in a smooth, uniform fashion, and it is possible to use a relatively short-stroke cylinder assembly to control the entire range of movement.

Continued lowering of the assembly 28 toward the position shown in FIG. 5 is controlled by the cylinder assembly 32 and linkage assembly 30 until the marker disk 86 engages the ground, at which point continued extension of the rod 106 causes the link 90 to pivot about the pin 92 so that the pin 100 of the transfer link is positioned intermediate the ends of the slot 98. This position represents the final use position of the apparatus.

During operation of the planter, as it is being pulled across the ground, the marker disk 86 engages the ground, slicing into it to form a line that the farmer uses during his next pass through the field. As the marker disk travels over undulations, the outboard arm assembly is allowed to float, as shown in FIG. 8, between a lowermost position in which the pin 100 of the transfer link engages one end of the slot 98, and an uppermost position in which the pin engages the opposite end of the slot. Thus, the pin-in-slot, lost motion connection between the pivot and transfer links defines a float means for permitting a limited range of free relative pivotal movement of the outboard arm assembly.

In order to return the apparatus to the storage position, the rod 106 is retracted into the cylinder 104, and the inboard and outboard arm assemblies are pulled to the storage position. It will be appreciated that the sequence of raising the inboard arm assembly 26 and folding the outboard arm assembly 28 is generally the reverse of respective lowering and unfolding of the assemblies, as previously described. Suffice it to explain that once the inboard arm assembly 26 has reached the FIG. 3 position, the outboard arm assembly 28 abuts the stop 52 and is therefore prevented from further folding movement. Thus, as the rod 106 retracts beyond the FIG. 3 position, the inboard arm assembly 26 continues to raise to its storage position, while the outboard arm assembly 28 remains relatively stationary. Thus, the entire cylinder assembly 32 is protected within the tool bar of the planter when the apparatus is stored, and is protected from damage. Further, if desired, it is possible to remove the entire apparatus from the tool bar simply by removing the fasteners which extend through the face plate 40 and the flange 20, and to install the apparatus on a different implement having a similar tool bar construction. Likewise, the apparatus may be easily removed for storage or repair.

Although the present invention has been described with reference to the preferred embodiment illustrated in the attached drawing figures, it is noted that substitutions may be made and equivalents employed herein without departing from the scope of the invention as recited in the claims.

What is claimed is:

1. A low profile folding row marker apparatus for use with an agricultural implement presenting a generally hollow, tubular, transverse frame element, the apparatus comprising:

an elongated marker mount including a first end sized for receipt within the frame element of the implement and a second end protruding from the frame element;

an inboard arm assembly connected to the second end of the marker mount for relative pivotal movement about a first horizontal axis between a raised generally vertical storage position and a lowered generally horizontal use position;

an outboard arm assembly presenting a first end connected to the inboard arm assembly for pivotal folding and unfolding movement relative to the inboard arm assembly about a second horizontal axis parallel to the first axis, and an opposed free end, the outboard arm assembly being moveable through a range of about 90° relative to the inboard arm assembly between a folded storage position perpendicular to the inboard arm assembly and an unfolded use position generally parallel to the inboard arm assembly;

a marker carried on the free end of the outboard arm assembly and adapted to engage the ground when the inboard and outboard arm assemblies are in the use position; and actuating mechanism for sequentially moving the inboard and outboard arm assemblies between the storage and use positions, said actuating mechanism including a fluid actuated cylinder secured to the mount and an operating linkage having at least two link members operably connected between the cylinder and the outboard arm assembly for folding and unfolding the outboard arm assembly relative to the inboard arm assembly, one of said link members having a pivotal connection with said inboard arm assembly whereby the cylinder also raises and lowers said inboard arm assembly relative to the mount, said cylinder and said one link member being so disposed that the line of action of the cylinder causes the linkage to keep the outboard arm assembly folded during raising and lowering of the inboard arm assembly unless the inboard arm assembly is below a predetermined point in its path of travel, below which point the line of action of the cylinder causes the linkage to fold or unfold the outboard arm assembly concurrently with raising or lowering of the inboard arm assembly depending upon whether the inboard arm assembly is being raised or lowered.

2. A low profile folding row marker apparatus as claimed in claim 1, said cylinder having its line of action disposed on one side of said pivotal connection of said one link member with the inboard arm assembly when the inboard arm assembly is above said predetermined point in its path of travel and having its line of action disposed on the opposite side of said pivotal connection when the inboard arm assembly is below said predetermined point in its path of travel.

3. A low profile folding row marker apparatus as claimed in claim 2, said one link member having one end connected to the cylinder and an opposite end connected to the remainder of the linkage, said pivotal connection of said one link member with the inboard arm assembly being located on said one link member intermediate said ends thereof so that the line of action of the cylinder tends to rotate said one link member in one direction when the inboard arm assembly is above said predetermined point and in the opposite direction when the inboard arm assembly is below said predetermined point.

4. A low profile folding row marker apparatus as claimed in claim 3, said inboard arm assembly having a stop disposed in the path of folding movement of the outboard arm assembly to prevent further folding movement of the outboard arm assembly beyond its storage position when the inboard arm assembly is above said predetermined point in its path of travel.

5. A low profile folding row marker apparatus as claimed in claim 4, said linkage further including a lug on said outboard arm assembly and a transfer link pivotally connected between said lug and said opposite end of said one link member.

6. A low profile folding row marker apparatus as claimed in claim 5, said transfer link being pivotally connected to said opposite end of said one link member with a lost motion connection to allow the outboard arm assembly to rise and fall to a limited extent relative to the inboard arm assembly in response to changes in ground terrain.

7. A low profile folding row marker apparatus as claimed in claim 1, said inboard arm assembly having a stop disposed in the path of folding movement of the outboard arm assembly to prevent further folding movement of the outboard arm assembly beyond its storage position when the inboard arm assembly is above said predetermined point in its path of travel.

8. A low profile folding row marker apparatus as recited in claim 1, wherein the outboard arm assembly includes a length that is adjustable so that the position of the marker carried on the free end of the outer arm assembly may be adjusted relative to the implement.

9. A low profile folding row marker apparatus as recited in claim 1, further comprising a breakaway means for permitting the outboard arm assembly to break away from the inboard arm assembly about a vertical axis when an obstruction is engaged by the marker and exerts a predetermined horizontal force on the outboard arm assembly.

* * * * *